United States Patent
Hunt et al.

(10) Patent No.: US 11,624,650 B2
(45) Date of Patent: Apr. 11, 2023

(54) SYSTEMS AND METHODS FOR FILTERING SENSOR SIGNAL INTERFERENCE DERIVING FROM POWERED COMPONENTS OF A HEADER

(71) Applicant: CNH Industrial America LLC, New Holland, PA (US)

(72) Inventors: Cory Douglas Hunt, Millersville, PA (US); Bart M. A. Missotten, Herent (BE); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/569,257

(22) Filed: Jan. 5, 2022

(65) Prior Publication Data

US 2022/0128404 A1   Apr. 28, 2022

Related U.S. Application Data

(63) Continuation of application No. 17/083,734, filed on Oct. 29, 2020, now Pat. No. 11,231,317, which is a
(Continued)

(51) Int. Cl.
*A01D 41/127* (2006.01)
*G01J 1/44* (2006.01)
(Continued)

(52) U.S. Cl.
CPC .............. *G01J 1/44* (2013.01); *A01D 41/127* (2013.01); *A01D 57/12* (2013.01); *G01J 1/4204* (2013.01);
(Continued)

(58) Field of Classification Search
CPC ... G01J 1/44; G01J 1/4204; G01J 1/18; A01D 41/127; A01D 57/12; A01D 57/02;
(Continued)

(56) References Cited

U.S. PATENT DOCUMENTS

| | | |
|---|---|---|
| 4,009,555 A | 3/1977 | Temple |
| 4,228,636 A | 10/1980 | Homburg |

(Continued)

FOREIGN PATENT DOCUMENTS

| | | |
|---|---|---|
| DE | 102017203950 A1 | 11/2017 |
| DE | 102018131748 A1 | 6/2020 |

(Continued)

OTHER PUBLICATIONS

Extended European Search Report for EP Application No. 21205195.7 dated Mar. 9, 2022 (8 pages).

*Primary Examiner* — Donald L Raleigh
(74) *Attorney, Agent, or Firm* — Peter Zacharias; Patrick Sheldrake (57) ABSTRACT

In one aspect, a system for filtering signal interference from sensors signals includes a header comprising a frame and a powered component supported relative to the frame, and a sensor configured to detect electromagnetic waves indicative of a parameter associated with the header. In addition, the system includes an electronic control unit operably connected to the sensor such that the electronic control unit is configured to receive signals from the sensor associated with the detection of the electromagnetic waves. The electronic control unit is further configured to filter interference from the signals deriving from motion of the powered component relative to the sensor.

20 Claims, 7 Drawing Sheets

Related U.S. Application Data continuation-in-part of application No. 16/545,621, filed on Aug. 20, 2019, now Pat. No. 10,829,033.

(51) Int. Cl.
| | | |
|---|---|---|
| *A01D 57/12* | (2006.01) | |
| *G01P 3/00* | (2006.01) | |
| *H04B 15/00* | (2006.01) | |
| *G08C 17/00* | (2006.01) | |
| *G01J 1/42* | (2006.01) | |
| *F21V 23/04* | (2006.01) | |

(52) U.S. Cl.
CPC ............... *G01P 3/00* (2013.01); *G08C 17/00* (2013.01); *H04B 15/00* (2013.01); *F21V 23/0464* (2013.01)

(58) Field of Classification Search
CPC ........... G01P 3/00; G01P 3/481; G08C 17/00; H04B 15/00; F21V 23/0464
See application file for complete search history.

(56) References Cited

U.S. PATENT DOCUMENTS

| | | |
|---|---|---|
| 4,502,270 A | 3/1985 | Shupert |
| 4,918,441 A | 4/1990 | Bohman |
| 5,161,874 A | 11/1992 | Benes |
| 5,246,285 A | 9/1993 | Redburn |
| 8,868,304 B2 | 10/2014 | Bonefas |
| 9,220,195 B2 | 12/2015 | Eggenhaus et al. |
| 9,403,474 B2 | 8/2016 | Kaatrasalo et al. |
| 10,023,106 B2 | 7/2018 | Gresch |
| 10,034,424 B2 | 7/2018 | Anderson et al. |
| 2010/0107584 A1 | 5/2010 | Sheidler |
| 2011/0080748 A1 | 4/2011 | Huang |
| 2012/0206050 A1* | 8/2012 | Spero ................... B60Q 1/1423 315/152 |
| 2015/0124054 A1 | 5/2015 | Darr et al. |
| 2015/0195991 A1 | 7/2015 | Ricketts |
| 2018/0236928 A1 | 8/2018 | Fritz et al. |
| 2018/0332767 A1* | 11/2018 | Muench ................. A01D 57/04 |
| 2020/0031270 A1 | 1/2020 | Beschorn |
| 2021/0088691 A1 | 3/2021 | Ferren et al. |

FOREIGN PATENT DOCUMENTS

| | | | |
|---|---|---|---|
| EP | 2158799 | 12/2012 | |
| EP | 3130211 | 2/2017 | |
| EP | 3403485 A1 | 11/2018 | |
| WO | WO 2008/151371 A1 | 12/2008 | |
| WO | WO-2018115832 A1 * | 6/2018 | ............. A01B 47/00 |

* cited by examiner

SYSTEMS AND METHODS FOR FILTERING SENSOR SIGNAL INTERFERENCE DERIVING FROM POWERED COMPONENTS OF A HEADER

CROSS-REFERENCE TO RELATED APPLICATIONS

The present application is a continuation of U.S. patent application Ser. No. 17/083,734, filed Oct. 29, 2020, which, in turn, is a continuation-in-part of and claims the right of priority to U.S. patent application Ser. No. 16/545,621, filed Aug. 20, 2019 and entitled "Automatically Controlled Header Work Lights," the disclosures of both of which are hereby incorporated by reference herein in their entirety for all purposes.

BACKGROUND OF THE INVENTION

The present invention pertains to sensor-based detection systems for agricultural vehicles and, more specifically, to systems and methods for filtering out sensor signal interference deriving from powered components of a header of an agricultural vehicle.

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop material into a threshing rotor. The threshing rotor rotates within a perforated housing, which may be in the form of adjustable concaves, and performs a threshing operation on the crop to remove the grain. The threshing rotor is provided with rasp bars that interact with the crop material in order to further separate the grain from the crop material, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a floor such as a deck, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which has a cutter bar, a draper belt, and a rotating reel with tines or the like in order to harvest a bushy or fluffy crop, such as soy beans or canola. Alternatively, the header may be in the form of a corn header which includes an auger and row units with snouts, gathering chains, and stalk rolls in order to harvest corn.

Within the industry, there is an ever-increasing demand for systems designed to automatically control the operation of components associated with agricultural vehicles, including components associated with headers of agricultural harvesters. Typically, automated header-related systems rely on the use of sensors or sensing devices to provide feedback associated with a monitored parameter or operating condition of the header, which then allows a controller to automatically determine control outputs for controlling the operation of one or more components of the header based on the feedback received from the sensor(s) or sensing device (s). However, when a header includes powered components (e.g., powered rotating components), the motion of such components often results in a significant amount of noise or interference within the sensor feedback provided to the controller. This noise/interference in the sensor feedback often results in the controller generating control outputs that are not as accurate or effective as desired.

Accordingly, a need exists for systems and methods for filtering out sensor signal interference deriving from powered components of a header of an agricultural vehicle.

SUMMARY OF THE INVENTION

In one aspect, the present subject matter is directed to a system for filtering signal interference from sensors signals associated with headers configured for use with agricultural vehicles. The system includes a header comprising a frame and a powered component supported relative to the frame, and a sensor configured to detect electromagnetic waves indicative of a parameter associated with the header. In addition, the system includes an electronic control unit operably connected to the sensor such that the electronic control unit is configured to receive signals from the sensor associated with the detection of the electromagnetic waves. The electronic control unit is further configured to filter interference from the signals deriving from motion of the powered component relative to the sensor.

In another aspect, the present subject matter is directed to a method for filtering signal interference from sensor signals associated with headers configured for use with agricultural vehicles. The method includes moving a powered component of a header relative to a sensor configured to detect electromagnetic waves indicative of a parameter associated with the header. The method also includes receiving, with an electronic control unit, sensors signals from the sensor associated with the detection of the electromagnetic waves, and filtering, with the electronic control unit, interference from the sensor signals deriving from movement of the powered component relative to the sensor.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural harvester and/or components thereof are usually determined with reference to the direction of forward operative travel of the harvester, but they should not be construed as limiting. The terms "longitudinal" and "transverse" are determined with reference to the fore-and-aft direction of the agricultural harvester and are equally not to be construed as limiting.

In general, the present subject matter is directed to systems and methods for filtering signal interference from sensor signals providing an indication of one or more parameters associated with a header of an agricultural vehicle. Specifically, in several embodiments, the disclosed systems and methods are configured to filter out signal interference deriving from one or more powered components of the header, such as a rotating reel of the header. For instance, as will be described below, an electronic control unit may be configured to apply one or more filtering methods, such as a frequency-based filtering method, an amplitude-based filtering method, and/or a distance-based filtering method, to sensor signals received from one or more sensors operably coupled to the electronic control unit (e.g., one or more light sensors and/or radar sensors) to filter out or remove noise or interference deriving from rotation of the reel relative to such sensors. The filtered sensor signals can then be utilized by the electronic control unit to generate control outputs for controlling the operation of one or more components of the header. By removing the noise/interference from the sensor signals, the electronic control unit can more accurately estimate or determine the header-related parameter(s) associated with such sensor data, thereby allowing the electronic control unit to generate control outputs to more effectively control the operation of the related header component(s).

For purposes of discussion, the present subject matter will generally be described herein with reference to filtering signal interference from sensor signals received from sensors associated with automatic lighting and height control systems for a header. However, it should be appreciated that, in other embodiments, the present subject matter may also be advantageously applied to filter signal interference from sensor signals received from sensors associated with any other header-related systems. In addition, although the present subject matter will generally be described herein with reference to filtering signal interference deriving primarily from the rotating reel of a header, the disclosed systems and methods may also be advantageously applied to filter signal interference deriving from any other powered components of a header, such as an conveyer or an auger of a header.

Figure 1:
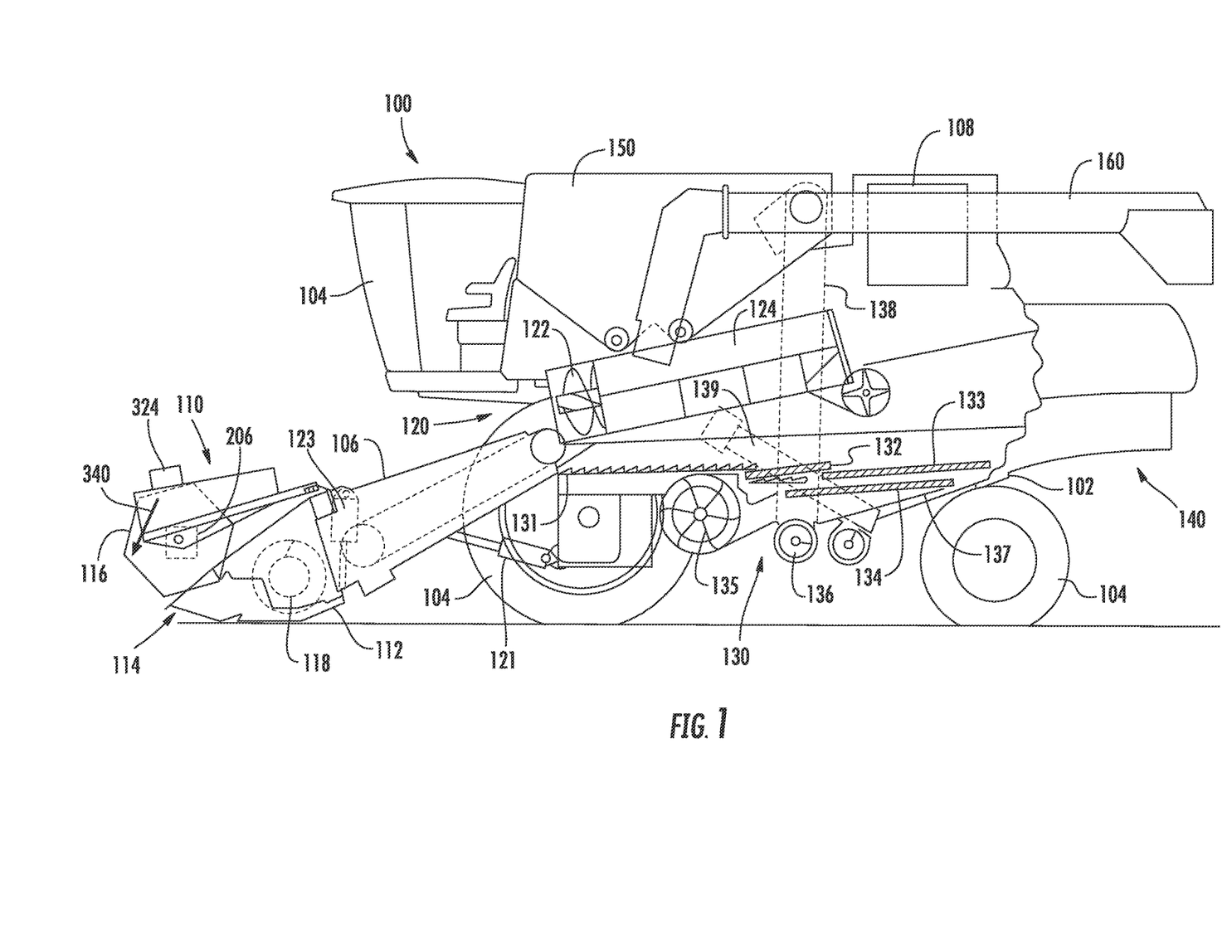
FIG. 1 illustrates a perspective view of an exemplary embodiment of an agricultural vehicle including a header, in accordance with an exemplary embodiment of the present invention.

Referring now to the drawings, and more particularly to FIG. 1, there is shown an exemplary embodiment of an agricultural vehicle 100 in the form of a combine 100. However, the agricultural vehicle 100 may be in the form of any desired agricultural vehicle 100, such as a windrower. The agricultural vehicle 100 generally includes a chassis 102, ground engaging wheels and/or tracks 104, a feeder housing 106, and a prime mover 108. The combine 100 may also include a header 110, a separating system 120, a cleaning system 130, a discharge system 140, an onboard grain tank 150, and an unloading auger 160.

The threshing system 120 may be of the axial-flow type, and thereby may include an axially displaced threshing rotor 122 which is at least partially enclosed by a rotor housing 124. The rotor housing 124 can include a rotor cage and perforated concaves. The cut crop is threshed and separated by the rotation of rotor 122 within the rotor housing 124 such that larger elements, for example stalks, leaves, and other MOG is discharged out of the rear of agricultural vehicle 100 through the discharge system 140. Smaller elements of crop material, such as grain and non-grain crop material, including particles lighter than grain, such as chaff, dust and straw, may pass through the perforations in the concaves and onto the cleaning system 130.

The cleaning system 130 may include a grain pan 131, a sieve assembly which can include an optional pre-cleaning sieve 132, an upper sieve 133 (also known as a chaffer sieve), a lower sieve 134 (also known as a cleaning sieve), and a cleaning fan 135. The grain pan 131 and pre-cleaning sieve 132 may oscillate in a fore-to-aft manner to transport the grain and finer non-grain crop material to the upper sieve 133. The upper sieve 133 and lower sieve 134 are vertically arranged relative to each other, and may also oscillate in a fore-to-aft manner to spread the grain across sieves 133, 134, while permitting the passage of clean grain, by gravity, through openings in the sieves 133, 134. The fan 135 may provide an airstream through the sieves 132, 133, 134 to blow non-grain material, such as chaff, dust, and other impurities, toward the rear of the agricultural vehicle 100.

The cleaning system 130 may also include a clean grain auger 136 positioned crosswise below and toward the front end of the sieves 133, 134. The clean grain auger 136 receives clean grain from each sieve 133, 134 and from a bottom pan 137 of the cleaning system 130. The clean grain auger 136 conveys the clean grain laterally to a generally vertically arranged grain elevator 138 for transport to the grain tank 150. The cleaning system 130 may additionally include one or more tailings return augers 139 for receiving tailings from the sieves 133, 134 and transporting these tailings to a location upstream of the cleaning system 130 for repeated threshing and/or cleaning action. Once the grain tank 150 becomes full, the clean grain therein may be transported by the unloading auger 160 into a service vehicle.

The header 110 is removably attached to the feeder housing 106. The header 110 generally includes a frame 112, a cutter bar 114 that severs the crop from a field, a rotatable reel 116 rotatably mounted to the frame 112, which feeds the cut crop into the header 110, and a conveyor 118, e.g. an auger 118 with fighting, that feeds the severed crop inwardly from each lateral end of the frame 112 toward feeder housing 106. The header 110 may be in the form of any desired header, such as a draper header or a corn header. As can be appreciated, the header 110 may be at least partially lifted or carried by the feeder housing 106, which typically includes an actuating system with one or more hydraulic cylinders. In one embodiment, the actuating system may be used to adjust a height of the header 110 relative to the ground so as to maintain the desired cutting height between the header 110 and the ground. For instance, as shown in FIG. 1, the actuating system may include a height cylinder 121 (e.g., coupled between the feeder housing 106 and a portion of the chassis 102 of the vehicle 100) that is configured to adjust the height or vertical positioning of the header 110 relative to the ground by pivoting the feeder housing 106 to raise and lower the header 110 relative to the ground. In addition, the actuating system may also include a tilt cylinder(s) 123 coupled between the header 110 and the feeder housing 106 to allow the header 110 to be tilted relative to the ground surface or pivoted laterally or side-to-side relative to the feeder housing 106.

Figure 2:
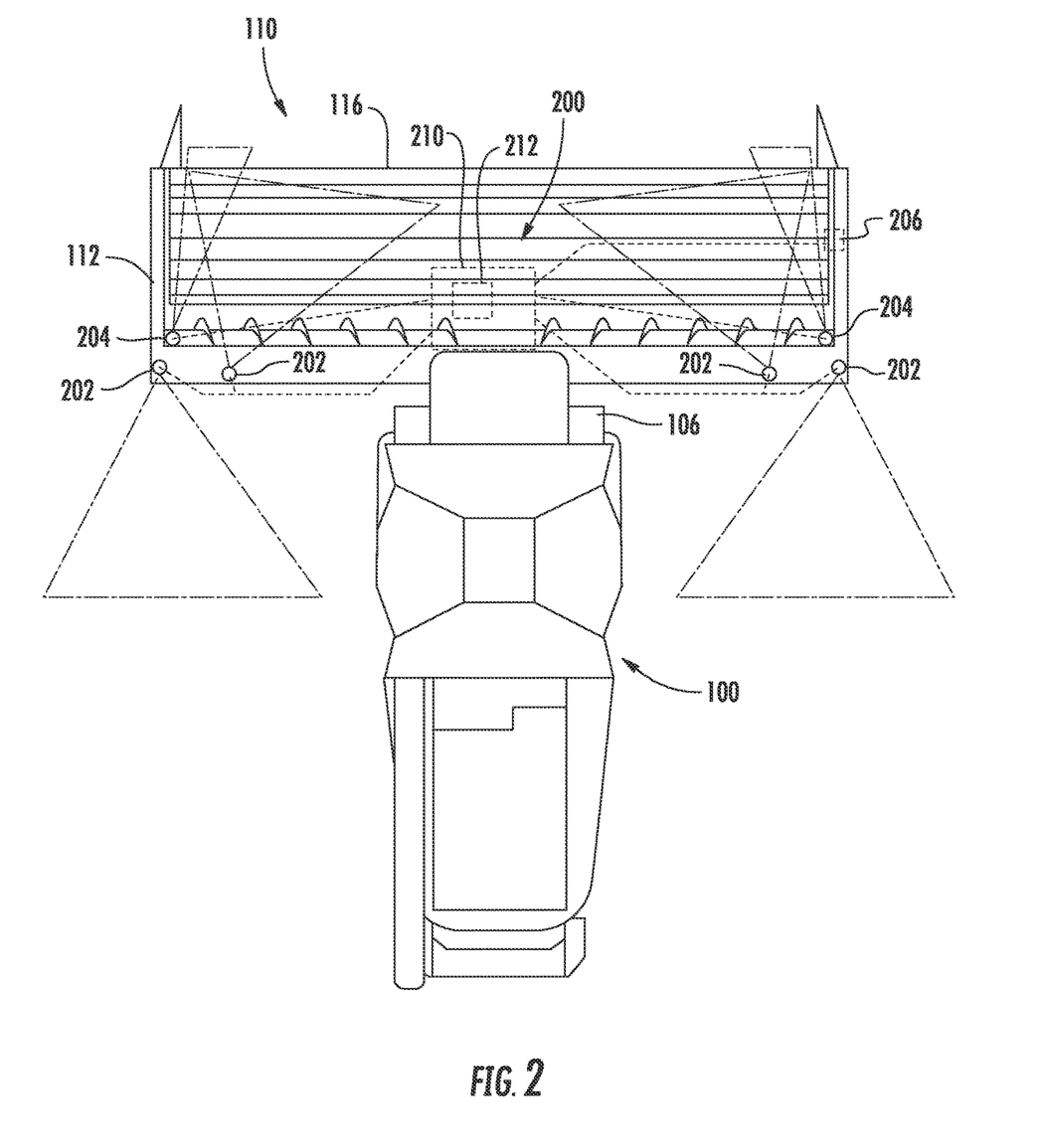
FIG. 2 illustrates an automatic lighting system for the header of FIG. 1, in accordance with an exemplary embodiment of the present invention.

Referring now collectively to FIGS. 1-2, there is shown an exemplary embodiment of an automatic lighting system 200 for the header 110. The automatic lighting system 200 generally includes at least one light 202, at least one sensor 204 for sensing a level of light surrounding the header 110, and an electronic control unit (ECU) 210, e.g. a controller 210 with a memory 212. The controller 210 automatically operates the light(s) 202 upon communicating with the sensor(s) 204.

The light(s) 202 may be connected to the frame 112 of the header 110 at any desired location. As shown, the automatic lighting system 200 includes four lights 202 with two lights 202 being attached to the lateral ends of the frame 112, for illuminating an area behind the frame 112, and two lights 202 being attached inwardly from the lateral ends of the frame 112, for illuminating the frame 112 where crop enters and flows through the header 110. However, it should be appreciated that the automatic lighting system 200 may include any number of lights 202 for illuminating any desired area located on or around the header 110. Each light 202 may be in the form of any desired light, such as an incandescent light bulb or light emitting diode (LED).

The automatic lighting system 200 includes a pair of sensors 204 in the form of left and right sensors 204 that are respectively located at the left and right ends of the header 110. However, the automatic lighting system 200 may include only one or more than two sensors 204. The sensor(s) 204 may be located at any desired location on the frame 112 of the header 110. Each sensor 204 may be located on a top surface, an inside surface, or an outside surface at a respective lateral end of the frame 112. Alternatively, the sensor(s) 204 may be positioned near the front of the header 110, where the header 110 engages crop, or at a middle portion of the header 110. It is noted that having two sensors 204 at the left and right ends of the header 110 prevents any interruption of the automatic lighting system 200 when the shadow of the agricultural vehicle 100, in dusk or dawn lighting conditions, undesirably shades one of the sensors 204. Each sensor 204 may be in the form of an ambient light sensor 204 for sensing the ambient light at any desired location within or around the header 110 and providing a corresponding signal. The ambient light sensor 204 may be in the form of any desired photosensor which may sense light and/or electromagnetic radiation. Each ambient light sensor 204 may have a preset threshold of the level of light which is indicative of low-light conditions. As used herein, the term "preset threshold of the level of light" may refer to any level or amount of ambient light at which an operator may desire an improved visibility to see the header 110 and/or surrounding areas thereof. The preset threshold of light may be the known level of light at which low-light conditions exist, for example during dusk, dawn, and/or nighttime. As can be appreciated, each sensor 204 may sense any form of light, such as light which is emitted from the sun and/or any other artificial light source. Additionally or alternatively, the sensor(s) 204 may be located on the agricultural vehicle 100. Each sensor located on the agricultural vehicle 100 may provide feedback which is closely representative to sensor(s) 204 located on the header 110.

According to a further aspect of the exemplary embodiment of the present invention, the sensor(s) 204 may detect the ambient light emitted from the lights of the agricultural vehicle 100, and the controller 210 may correspondingly turn on the light(s) 202 upon the sensor(s) 204 indicating that the lights of the agricultural vehicle 100 have already turned on. Automatically turning on the light(s) 202 of the header 110 when the lights of the agricultural vehicle 100 are turned on may be beneficial if improved visibility is desired even when ambient low-light conditions do not exist or when there is no option to manually turn on the light(s) 202, as with some older model agricultural vehicles.

The controller 210 may be operably connected to the light(s) 202 and sensor(s) 204. The controller 210 may automatically activate or deactivate the light(s) 202 upon the sensor(s) 204 reading that the ambient light is below or above the preset threshold of light, respectively. The controller 210 may be in the form of any desired analog or digital control unit. The memory 212 may be in the form of any desired tangible computer readable medium, and the memory 212 may store any desired information, such as the preset threshold value of ambient light which is indicative of low-light conditions. The controller 210 may interface with and/or be incorporated into existing hardware and/or software of the header 110 and/or agricultural vehicle 100. In other words, the controller 210 may be a separate unit as part of the automatic lighting system 200 and/or be integrated with the header 110 and/or agricultural vehicle 100. For instance, the header 110 may have a dedicated header controller which controls specific header-related functions, and the controller 210 may either be in the form of the dedicated header controller or be incorporated as part of the dedicated header controller.

According to another aspect of the exemplary embodiment of the present invention, the controller 210 may account for the rotational movement of the reel 116. In certain lighting conditions, the reel 116 may periodically block or prevent the sensor(s) 204 from sensing the ambient light. For example, the rotational speed of the reel 116 may be proportionate to one or more frequencies which may interfere with the sensor(s) 204 and thereby cause periodic shadowing of the sensor(s) 204. To mitigate the effect of this periodic shadowing, the controller 210 may calculate an adjusted input for filtering out the interference caused by the reel 116. For example, the controller 210 may communicate with a speed sensor 206 of the reel 116, use the measured speed of the reel 116 to calculate a corresponding frequency of the reel 116, and then filter out the frequency of the reel 116 from the signal(s) of the sensor(s) 204. Suitable systems, methods, and related controller functionality for filtering out the frequency of the reel 116 will generally be described below with reference to FIGS. 5-7. It should be appreciated that the reel speed sensor 206 may be operably coupled to the controller 210 by a wired or wireless connection. For instance, the reel speed sensor 206 may communicate to the controller 210 via a connected bus network.

Figure 3:
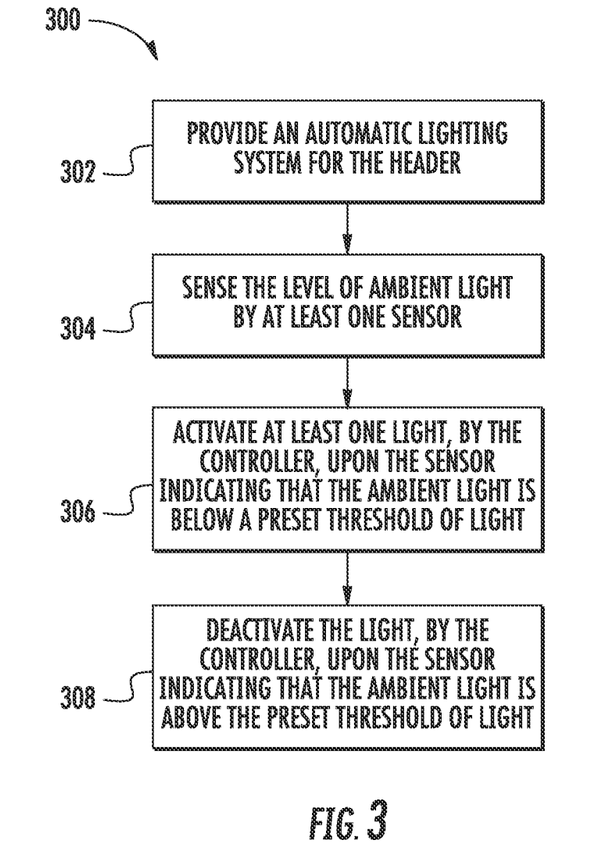
FIG. 3 illustrates a flowchart of a method for operating the lighting system, in accordance with an exemplary embodiment of the present invention.

Referring now to FIG. 3, there is shown a flowchart of a method 300 for operating the agricultural vehicle 100, and more particularly the automatic lighting system 200, in various lighting conditions, such as in low-light conditions. The method 300 may include an initial step of providing the header 110 with the automatic lighting system 200 as described above (at block 302). The method 300 includes a step of sensing the level of ambient light by the sensor(s) 204 (at block 304). The method 300 may also include a step of automatically activating the light(s) 202, by the controller 210, upon the sensor(s) 204 sensing that the level of light is below a preset threshold of light (at block 306). The method 300 may then include a step of automatically deactivating the light(s) 202, by the controller 210, upon the sensor(s) 204 sensing that the level of light is above the preset threshold of light (at block 308). Further, the method 300 may include another step of filtering interference, by the controller 210, upon the reel 116 blocking the sensor(s) 204. Herein, the controller 210 may identify the frequency of the rotating reel 116 and filter out any interference in the signal(s) of the sensor(s) 204 caused by the frequency of the reel 116. It should be appreciated that the automatic lighting system 200 may automatically turn on or off the light(s) 202 depending upon a set time of day. Additionally, if the agricultural vehicle 100 includes a user interface, e.g. a control panel or switch, the operator may input a control command to operate the automatic lighting system 200.

Figure 4:
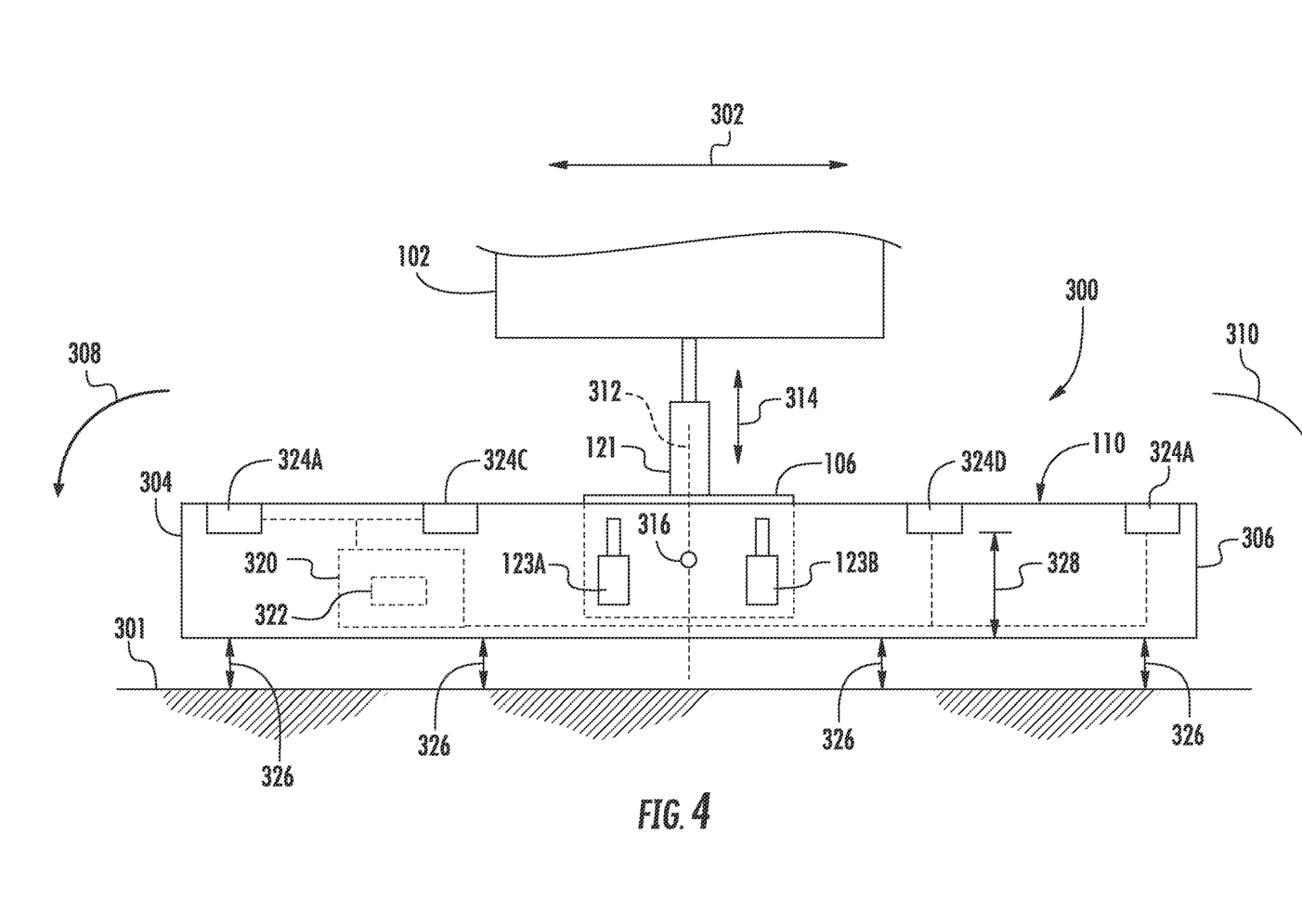
FIG. 4 illustrates an automatic height control system for the header of FIG. 1, in accordance with an exemplary embodiment of the present invention.

Referring now collectively to FIGS. 1 and 4, there is shown an exemplary embodiment of an automatic height control system 300 for regulating the height of the header 110 relative to the ground (e.g., a ground surface 301). As shown in FIG. 4, the header (as indicated schematically by box 110) generally extends side-to-side or in a lateral direction (indicated by arrow 302 in FIG. 4) between a first lateral end 304 and a second lateral end 306. Additionally, the header 110 may be pivotably coupled to the feeder housing 106 at a location between its first and second lateral ends 304, 306 to allow the header 110 to tilt laterally relative to the feeder housing 106 (e.g., in the tilt directions indicated by arrows 308, 310 in FIG. 4). In one embodiment, the header 110 may be coupled to the feeder housing 106 roughly at a lateral centerline 312 defined between the opposed lateral ends 304, 306 of the header 110. In such an embodiment, the height cylinder 121 may, for instance, be configured to raise and lower the end of the feeder housing 110 relative to the chassis 102 of the vehicle 100, thereby adjusting the vertical positioning of the header 110 along the lateral centerline 312 (e.g., in the vertical direction indicated by arrow 314). Additionally, the lateral tilt cylinder(s) 123 may be configured to laterally tilt the header 110 relative to the ground 301 (e.g., as indicated by arrows 308, 310) about a tilt axis 316 aligned with the lateral centerline 312 of the header 110.

In one embodiment, the height control system 300 may include a pair of tilt cylinders 123A, 123B. For instance, as shown in FIG. 4, a first tilt cylinder 123A may be coupled between the header 110 and the feeder housing 106 along one lateral side of the connection between the header 110 and the feeder housing 106, and a second tilt cylinder 123B may be coupled between the header 110 and the feeder housing 106 along the opposed lateral side of the connection between the header 110 and the feeder housing 106. In such an embodiment, the tilt cylinders 123A, 123B may be extended and retracted to pivot or tilt the header 110 about the tilt axis 316. However, in other embodiments, the system 300 may only include a single tilt cylinder 123, such as a cylinder coupled between the header 110 and the feeder housing 106 in the lateral direction 202 across the centerline 212 of the header 110 at a position vertically above or below the tilt axis 216.

In general, the operation of the height cylinder 121 and tilt cylinder(s) 123 may be automatically controlled via an electronic control unit (ECU) 320 (e.g. a controller 320 with a memory 322) to adjust the vertical positioning and tilt angle of the header 110 relative to the ground surface 301. For instance, a plurality of height sensors 324 may be provided on the header 110 to monitor one or more respective local distances or heights 326 defined between the header 110 and the ground surface 301 (e.g. as a function of an installed height 328 of the sensors 324 relative to the bottom of the header 110). Specifically, as shown in FIG. 4, the header 110 includes four height sensors 324 supported thereon for monitoring the local height 326 relative to the ground surface 301, such as by including a first height sensor 324A positioned adjacent to the first lateral end 304 of the header 110, a second height sensor 324B positioned adjacent to the second lateral end 306 of the header 110, and third and fourth height sensors 324C, 324D positioned between the first and second height sensors 324A, 324B along either side of the header centerline 312. In the illustrated embodiment, the height sensors 324 are spaced apart equally along the lateral width of the header 110. However, in other embodiments, the lateral spacing between the various height sensors 324 may be non-uniform or varied. It should also be appreciated that, although the header 110 is illustrated herein as including four height sensors 324, any number of height sensors 324 may be installed relative to the header 110 to provide an indication of the local height 326 defined between the header 110 and the ground surface 310 at a corresponding number of lateral sensor positions spaced apart across the width of the header 110.

It should be appreciated that, in several embodiments, each height sensor 324 may correspond to an active electromagnetic-based sensor configured to provide sensor data or signals indicative of the local height or distance 326 defined between the header 110 and the ground surface 301 based on the detection of reflected electromagnetic waves. For instance, in one embodiment, each height sensor 324 may correspond to a radar sensor configured to transmit radio waves outwardly therefrom for reflection off of the ground surface 301 and detect such reflected radio waves to provide an indication of the distance between the sensor 324 and the ground surface 301 (and, thus, the local height or distance 326 defined between the header 110 and the ground surface 301). In another embodiment, each height sensor 324 may correspond to a laser sensor or other light-based sensor configured to transmit light outwardly therefrom for reflection off of the ground surface 301 and detect such reflected visible light waves to provide an indication of the distance between the sensor 324 and the ground surface 301. In other embodiments, the height sensors 324 may correspond to any other suitable electromagnetic-based sensing devices. For instance, as opposed to an active electromagnetic-based sensor, each height sensor 324 may, instead, correspond to a passive electromagnetic-based sensor, such as a camera, that provides sensor data or signals indicative of the local height or distance 326 defined between the header 110 and the ground surface 301. Alternatively, the height sensors 324 may correspond to any other suitable non-contact sensors.

In general, the height signals or data provided by the various height sensors 324 may be used as a control input into the controller 320 for controlling the operation of both the height cylinder 121 and the tilt cylinder(s) 123. Specifically, the height data may be analyzed by the controller 320 in combination with the known spatial relationship between the sensors 324 and the header 110 (e.g., based on distance 328) to determine a control output(s) for controlling the operation of the cylinders 121, 123 to maintain the header 110 at the desired position relative to the ground surface 110. The controller 320 may be in the form of any desired analog or digital control unit. The memory 312 may be in the form of any desired tangible computer readable medium, and the memory 312 may store any desired information, such as data associated with the relative positions of the height sensors 324 along the header 110 (e.g., lateral position data and vertical position data) and data associated with the heights detected by the height sensors 324. The controller 320 may interface with and/or be incorporated into existing hardware and/or software of the header 110 and/or agricultural vehicle 100. In other words, the controller 320 may be a separate unit as part of the automatic height control system 300 and/or be integrated with the header 110 and/or agricultural vehicle 100. For instance, the header 110 may have a dedicated header controller which controls specific header-related functions, and the controller 320 may either be in the form of the dedicated header controller or be incorporated as part of the dedicated header controller.

It should be appreciated that, in several embodiments, the controller 320 may be configured to control the operation of the cylinders 121, 123 by automatically controlling the operation of one or more corresponding valve(s) (not shown) configured to regulate the supply of fluid (e.g., hydraulic fluid or air) to each cylinder. For instance, the controller 320 may be coupled to one or more height control valves (not shown) for regulating the supply of fluid to the height cylinder 121 and one or more tilt control valves (not shown) for regulating the supply of fluid to the tilt cylinder(s) 123. In such an embodiment, the controller 320 may be configured to transmit suitable control outputs (e.g., current commands) to each control valve to adjust its associated valve position, thereby allowing the controller 320 to vary the supply of fluid to the corresponding cylinder(s) 121, 123 and, thus, automatically control the retraction/extension of such cylinder(s) 121, 123. Alternatively, in embodiments in which the cylinders 121, 123 correspond to electric-driven actuators (e.g., solenoid actuated cylinders), the controller 320 may be configured to transmit suitable control outputs (e.g., current commands) to each associated solenoid to automatically control the retraction/extension of the respective cylinder(s) 121, 123.

As particularly shown in FIG. 1, in several embodiments, the height sensors 324 may be configured to be installed on the header 110 at a location above the reel 116, such as at a location at or adjacent to the top of the header 110. In such embodiments, the height sensors 324 may be required to sense the location of the ground surface 310 through the reel 116. For instance, when the height sensors 324 correspond to active electromagnetic-based sensing devices, such as radar sensors or laser sensors, the height sensors 324 may be required to transmit waves through the rotating reel 116 to the ground surface (e.g., as indicated by arrow 340 in FIG. 1) and detect the reflected waves transmitted back through the rotating reel 116 to the sensors 324. In such instance, the controller 320 may be configured to account for the rotational movement of the reel 116 when processing the signals received from the sensors 324. For example, the rotational speed of the reel 116 may be proportionate to one or more frequencies which may interfere with the sensor(s) 324 and thereby cause periodic interference of the waves being detected by the sensor(s) 324. To mitigate this issue, the controller 320 may calculate an adjusted input for filtering out the interference caused by the reel 116. For example, in one embodiment, the controller 320 may communicate with the speed sensor 206 (FIG. 1) of the reel 116, use the measured speed of the reel 116 to calculate a corresponding frequency of the reel 116, and then filter out the frequency of the reel 116 from the signal(s) of the sensor(s) 324. Suitable systems, methods, and related controller functionality for filtering out the frequency of the reel 116 will generally be described below with reference to FIGS. 5-7.

Figure 5:
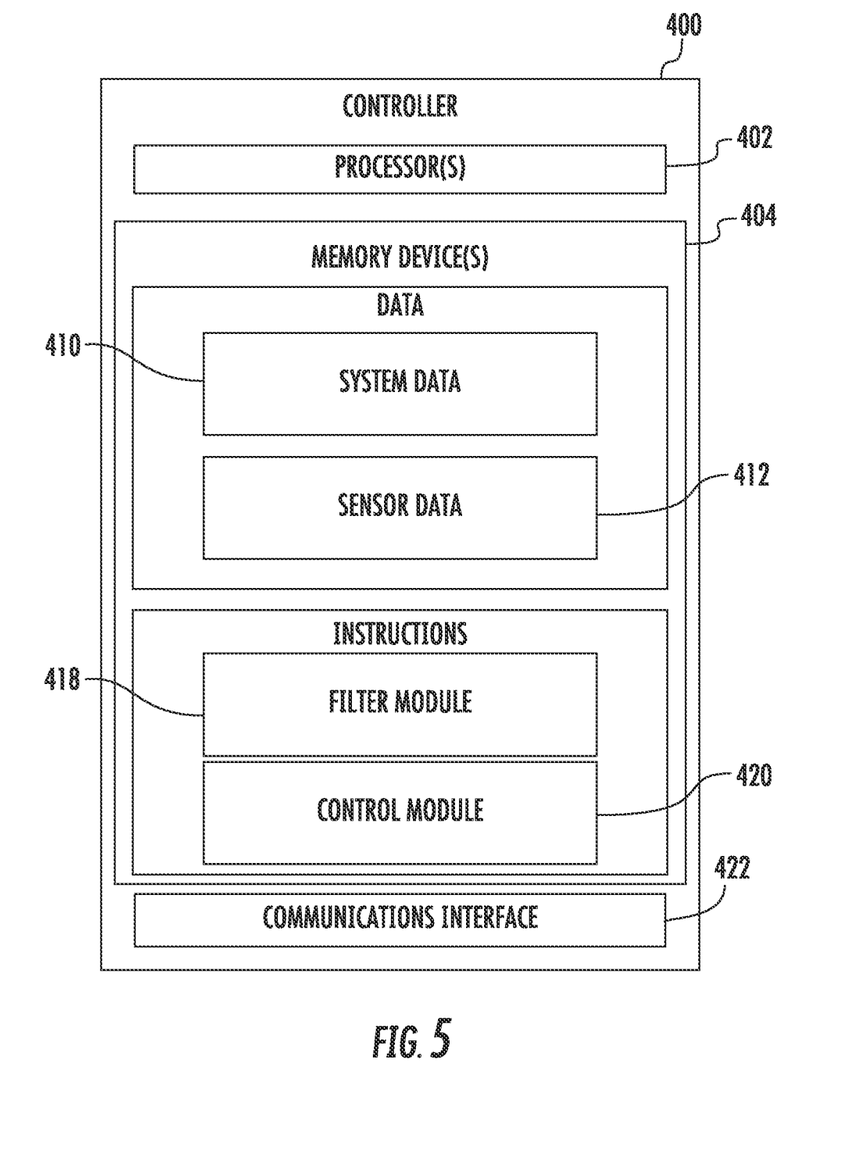
FIG. 5 illustrates a schematic view of one embodiment of an electronic control unit suitable for use within or as a component of one or more of the systems disclosed herein, in accordance with an exemplary embodiment of the present invention.

Referring now to FIG. 5, a schematic view of one embodiment of an electronic control unit (ECU) 400 suitable for use within or as a component of one or more of the systems disclosed herein is illustrated in accordance with aspects of the present subject matter. Specifically, in several embodiments, the ECU 400 may correspond to the ECU 210 of the automatic lighting system 200 described above with reference to FIGS. 1 and 2 and/or the ECU 320 of the automatic header height control system 300 described above with reference to FIGS. 1 and 4. In one embodiment, the ECU 400 may be configured to provide the functionality of each ECU 210, 320 described above such that the ECU 400 may be used to execute both the automatic lighting system 200 and the header height control system 300. Alternatively, separate ECUs may be provided to execute the required processing and control functionality associated with each respective system 200, 300, with each ECU being configured the same as or similar to the ECU 400 shown in FIG. 5.

As shown in FIG. 5, the ECU 400 (referred to hereinafter as "controller 400") may generally correspond to any suitable processor-based device(s), such as a computing device or any combination of computing devices. Thus, in several embodiments, the controller 400 may include one or more processor(s) 402 and associated memory device(s) 404 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 404 of the controller 400 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 404 may generally be configured to store suitable computer-readable instructions that, when implemented by the processor(s) 402, configure the controller 402 to perform various computer-implemented functions, such as the processing and/or control functionality described above with reference to the automatic lighting system 200 and/or the automatic header height control system 300.

In one embodiment, the memory 404 of the controller 400 may include one or more databases for storing information associated with the operation of the header 110, including data associated with controlling the lights 202 of the header 110 and/or the height of the header 110. For instance, as shown in FIG. 5, the memory 404 may include a system database 410 storing data associated with system parameters for executing the automatic lighting system 200 and/or the automatic header height control system 300. For instance, in association with the automatic lighting system 200, the system database 410 may include data associated with a preset threshold value of ambient light that is indicative of low-light conditions. Similarly, in association with the automatic header height control system 300, the system database 410 may include data associated with the relative positions of the height sensors 324 along the header 110 (e.g., lateral position data associated with the lateral spacing or positioning of the height sensors 324 across the header 110 in the lateral direction 302 (FIG. 4) and/or vertical position data associated with the vertical height of the installed locations of the height sensors 324 along the header 110) as well as data associated with a predetermined or target height value or height range for the header 110. In addition, the system database 410 may also include data associated with the powered, interference-generating components of the header 110, such as the rotating reel 116. For instance, in one embodiment, the system database 410 may include data associated with the number of laterally extending tine bars of the reel 116 (also often referred to as bat tubes), which, as will be described below, can be used in combination with the reel speed to determine the frequency at which the tine bars will pass through the field of view of any relevant sensors, thereby creating noise or interference within the resulting sensor signals.

Additionally, as shown in FIG. 5, the memory 404 may include a sensor database 412 storing sensor data, including raw or unfiltered sensor signals received from one or more sensors and/or filtered sensor signals as processed by the controller 400. For instance, the sensor database 410 may include data associated with the unprocessed or unfiltered sensor signals received from the light sensors 204 and/or the unprocessed or unfiltered sensor signals received from the height sensors 324. As will be described below, the controller 400 may be configured to process the signals received from the sensors 204, 324 to filter out any signal interference deriving from any powered components of the header 110, such as the rotating reel 116. In this regard, the filtered sensor signals generated via application of the associated filters may be stored within the sensor database 412.

Moreover, as shown in FIG. 5, in several embodiments, the instructions stored within the memory 404 of the controller 400 may be executed by the processor(s) 402 to implement a signal filter module 418. In general, the filter module 418 may be configured to apply one or more filters to the sensor signals received by the controller 400 to filter out any noise or interference within the signals. Specifically, in several embodiments, the filter module 418 may be configured to apply a suitable frequency attenuating filter (e.g., a linear continuous-time filter), to the sensor signals to filter out the noise or interference associated with the rotational motion of the reel 116 of the header 110. For instance, the filter module 418 may be configured to apply a bandstop filter that stops or filters out a given frequency (or a band of frequencies) that is proportional to or otherwise associated with the rotational speed of the reel 116. Specifically, the bandstop filter may be applied to filter out the frequency (or a band of frequencies) at which the tine bars of the reel 116 pass through the field of view of or otherwise impact the electromagnetic waves detected via the associated sensor (with such frequency or frequency range being referred to hereinafter simply as the "tine bar pass frequency"). In such an embodiment, all other frequencies may be allowed to pass through the filter for further processing and/or analysis by the controller 400.

In several embodiments, the controller 400 may be configured to dynamically determine the tine bar pass frequency during operation of the header 110. For instance, similar to the system embodiments described above, the controller 400 may be communicatively coupled to a speed sensor 206 (FIG. 1) configured to detect the rotational speed of the reel 116. In such instance, by knowing the number of laterally extending tine bars included within the reel 116 and by monitoring the reel speed via the feedback received from the speed sensor 206, the controller 400 can determine an instantaneous or current value for the tine bar pass frequency. This instantaneously determined or real-time frequency value(s) may then be utilized within the filter as the stopband frequency value(s) for filtering the signals received from the associated sensors (e.g., the light sensors 202 and/or the height sensors 324).

As an alternative to dynamically determining the tine bar pass frequency, the controller 400 may, instead, be configured to utilize a predetermined range of frequency values corresponding to the potential range of tine bar pass frequencies for the reel 116. For example, in one embodiment, the predetermined range of frequency values may be selected or determined based on an operating speed range for the reel 116, with the minimum frequency value of the predetermined frequency range corresponding to the tine bar pass frequency at the minimum reel speed of the operating speed range and the maximum frequency value of the predetermined frequency range corresponding to the tine bar pass frequency at the maximum reel speed of the operating speed range. In such an embodiment, the predetermined frequency range determined based on the operating speed range for the reel 116 may be applied as the stopband frequency values for filtering the signals received from the associated sensors (e.g., the light sensors 202 and/or the height sensors 324).

In yet another embodiment, the speed sensor 206 for the reel 116 may be configured to generate detection pulses or signals that are in sync with the tine bars passing through the field of view of the associated sensors, such as by generating detection signals at the same frequency as and in sync with the tine bar pass frequency. For instance, when the speed sensor 206 is configured as an optical speed sensor (e.g., an optical rotary encoder) that generates an electrical pulse or high signal each time a light passes through a slot or aperture in a rotating "code" disc/wheel, the circumferential spacing of the slots or apertures defined in the disc/wheel may be selected based on the circumferential spacing of the tine bars of the reel 116. In such an embodiment, by properly orienting the "code" disc/wheel relative to the reel 116 (e.g., by circumferentially aligning the slots/apertures with the tine bars of the reel 116), the sensor 206 may be configured to generate a detection pulse or high signal at the same frequency as and in sync with the tine bar pass frequency. Similarly, when the speed sensor 206 is configured as a magnetic speed sensor (e.g., an magnetic rotary encoder) that generates an electrical pulse or high signal each time a change in magnetic field is detected due to a magnetic pole provided on a rotating wheel or ring passing by an associated sensor, the circumferential spacing of the magnetic poles provided around the circumference of the wheel/ring may be selected based on the circumferential spacing of the tine bars of the reel 116. In such an embodiment, by properly orienting the wheel/ring relative to the reel 116 (e.g., by circumferentially aligning the magnetic poles with the tine bars of the reel 116), the sensor 206 may be configured to generate a detection pulse or high signal at the same frequency as and in sync the tine bar pass frequency. Regardless of the sensor type utilized, by configuring the speed sensor 206 as described above, the high/low status of the speed sensor signal may be used by the controller 400 as a logical condition to keep or discard the signals received from the relevant sensors. For instance, in one embodiment, the controller 400 may be configured to discard or otherwise ignore any data that is received from the light sensors 202 and/or the height sensors 324 simultaneously with a high signal from the speed sensor 206. In such an embodiment, it may be assumed that any light/height signals received between detection pulses or signals of the speed sensor 206 were not affected by the tine bars of the reel 116, and, thus, should be maintained by the controller 400.

It should be appreciated that, as an alternative to utilizing a frequency-based filtering method to filter out the interference or noise associated with sensor signals received from an active electromagnetic-based sensor, the controller 400 may, instead, be configured to use an amplitude-based filtering method. Specifically, in several embodiments, suitable reflectors may be installed on or otherwise associated with the reel 116 that are configured to reflect the electromagnetic waves transmitted from the active sensors (e.g., radio waves or visible light waves). For example, by installing a reflector(s) on each of the tine bars, the noise or interference introduced by such tine bars is intentionally exaggerated or amplified to an amplitude higher than a typical or expected amplitude range for the sensor signals, thereby allowing the noise to be more easily identified and filtered out. In such an embodiment, the controller 400 may, for instance, be configured to filter the sensor signals by discarding or ignoring data associated with amplitudes that exceed a predetermined maximum amplitude threshold. For instance, in one embodiment, the maximum amplitude threshold may be selected based on the expected or anticipated amplitude range of the sensor signals, such as by setting the maximum amplitude threshold as the maximum amplitude within the expected amplitude range (or the maximum amplitude plus a given buffer amount, such 1% to 5%). In such an embodiment, sensor signals associated amplitudes that are greater than the maximum amplitude threshold can be ignored as likely being associated with detection of the reel 116 (e.g., the reflection of radio or visible light waves off the tine bars) as opposed to the desired detection surface (e.g., the ground). In contrast, sensor signals associated amplitudes that are less than or equal to the maximum amplitude threshold can be maintained as likely being associated with detection of the desired detection surface (e.g., the ground) as opposed to the reel 116.

Additionally, it should be appreciated that, as another alternative to utilizing a frequency-based filtering method to filter out the interference or noise associated with sensor signals received from an active electromagnetic-based sensor, the controller 400 may, instead, be configured to implement a distance-based filtering method. Specifically, upon installed a sensor on the header 110 at a given location, the reel 116 will always be located relative to the sensor within a given range of known distances. By inputting this range of distances into the controller 400 (e.g., for storage within the system database 410), the controller 400 may be configured to filter the sensor signals by discarding or ignoring data associated with distances that do not exceed a preset minimum distance threshold. For instance, in one embodiment, the minimum distance threshold may be selected based on the range of distances that the reel 116 can potentially be located away from the sensor, such as by setting the minimum distance threshold as the maximum distance that the reel 116 can potentially be located away from the sensor such maximum distance plus a given buffer amount (e.g., 1% to 5%). In such an embodiment, sensor signals associated with distances that are equal to or less than the minimum distance threshold can be ignored as likely being associated with detection of the reel 116 (e.g., the reflection of radio or light waves off the tine bars) as opposed to the desired detection surface (e.g., the ground). In contrast, sensor signals associated distances that exceed the minimum distance threshold can be maintained as likely being associated with the detection of the desired detection surface (e.g., the ground) as opposed to the reel 116.

As shown in FIG. 5, in several embodiments, the instructions stored within the memory 404 of the controller 400 may also be executed by the processor(s) 402 to implement a control module 420. In general, the control module 420 may be configured to control the operation of one or more components of the header 110 and/or the agricultural vehicle 100 based on the filtered sensor signals provided via the signal filter module 418. For example, in association with the automatic lighting system 200, the control module 420 may be configured to control the operation of the lights 202 of the header 110 based on the filtered light signals, such as by activating one or more of the lights 202 when the filtered light signals indicate that the ambient light level is below a preset threshold of light and by deactivating the light(s) 202 when the filtered light signals indicate that the ambient light level is above the preset threshold of light. Similarly, in association with the automatic header height control system 300, the control module 420 may be configured to control the operation of the height cylinder 121 and/or the tilt cylinder(s) 123 (e.g., either directly or indirectly via associated control valves) based on the filtered height signals, such as by extending/retracting the height cylinder 121 and/or the tilt cylinder(s) 123, as necessary, so as to maintain the height of the header 110 at a desired or predetermined height setting value(s), such as an operator-selected target height or target height range for the header 110.

It should be appreciated that controller 400 may also include various other suitable components, such as a communications circuit or module, a network interface, one or more input/output channels, a data/control bus and/or the like. For instance, as shown in FIG. 5, the controller 400 may include a communications module or interface 422 to allow the controller 400 to communicate with any of the various other system components described herein. For instance, the controller 400 may, in several embodiments, be configured to receive data or sensor signals from the sensor(s) used to detect one or more parameters associated with the header 110 (e.g., the light sensors 202 and/or the height sensors 324) via any suitable connection with the communications interface 422, such as a wired or wireless connection.

Figure 6:
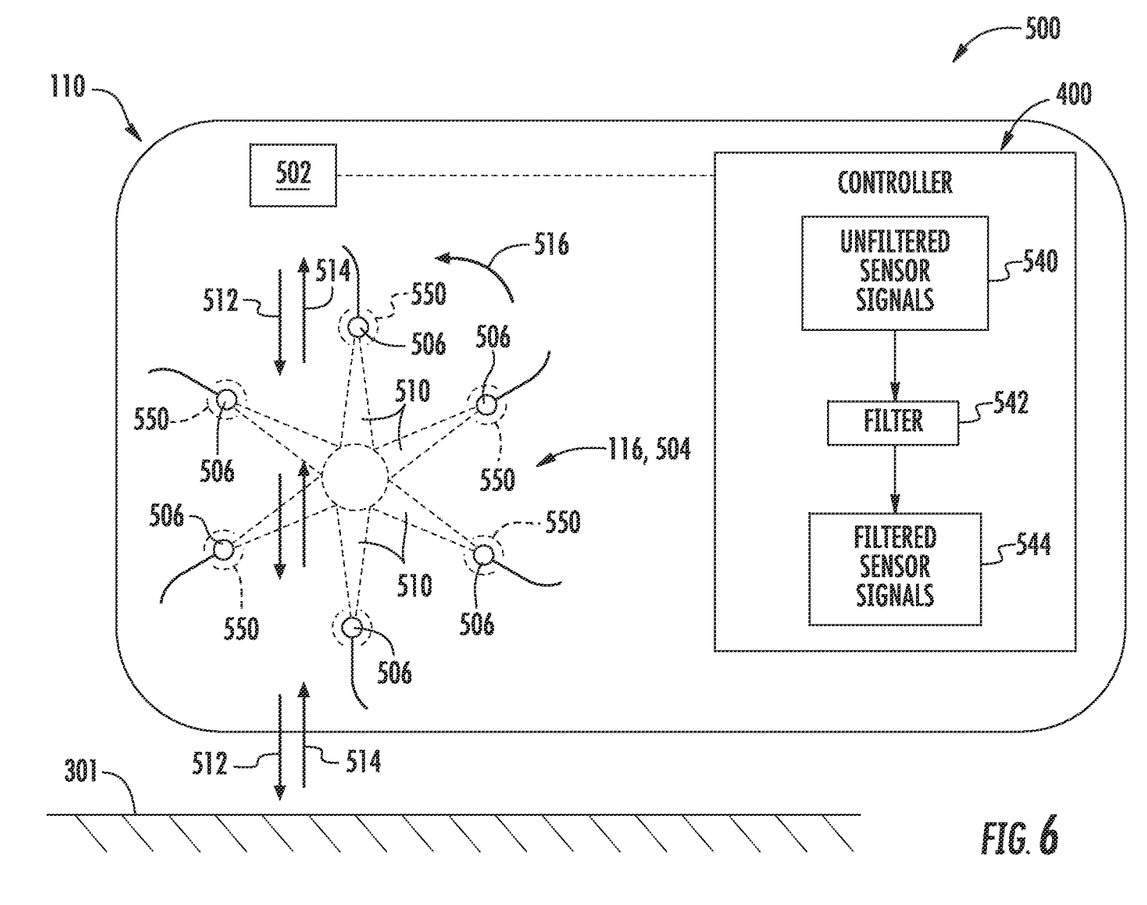
FIG. 6 illustrates a schematic view of one embodiment of a system for filtering signal interference deriving from powered components of a header of an agricultural vehicle, in accordance with an exemplary embodiment of the present invention.

Referring now to FIG. 6, a schematic view of one embodiment of a system 500 for filtering signal interference deriving from powered components of a header of an agricultural vehicle is illustrated in accordance with aspects of the present subject matter. In general, the system 500 will be described with reference to utilizing the controller 400 of FIG. 4 to filter sensor signals to remove interference or noise deriving from the rotating reel of a header. However, it should be appreciated that, in other embodiments, the disclosed system 500 may be implemented with controllers having any other suitable configuration and/or to filter sensor signals to remove interference or noise deriving from any other powered components of a header. It should also be appreciated that, for purposes of discussion, the system 500 of FIG. 6 will generally be described with reference to the use of active electromagnetic-based sensors (i.e., sensors that transmit electromagnetic waves outwardly therefrom and subsequently receive or detect the waves as reflected off a surface), such as the height sensors 324 described above with reference to FIG. 4. However, in other embodiments, the system 500 may also be utilized to filter signals received from passive sensors (e.g., the light sensors 202 described above with reference to FIG. 2) to remove interference or noise deriving from a powered component of a header.

As shown in FIG. 6, the system 500 includes an active electromagnetic-based sensor 502 supported on a header (indicated schematically in FIG. 6 by box 110) relative to a powered component 504 of the header 110. As shown in the illustrated embodiment, the powered component is configured as a reel 116 including a plurality of tine bars 606 spaced apart circumferentially around the outer perimeter of the reel 116, with each tine bar 506 being supported relative to a central hub or tube 508 of the reel 116 via a respective support member 510 (e.g., a spider or spoke). Each tine bar 606 may generally include a support bar or tube and a plurality of tines extending outwardly from the support bar or tube. As is generally understood, the reel 116 may be powered via a motor (or other suitable rotational drive source) such that the reel 116 is rotationally driven relative to sensor 502.

It should be appreciated that, as an alternative to installing the sensor 502 on the header 110, the sensor 502 may, instead, be installed at any other suitable location relative to the header 110. For instance, in one embodiment, the sensor 502 may be installed on the agricultural vehicle 110 (e.g., on the cab roof) such that the sensor 502 has a field of view directed at least partially through the rotating reel 116.

In the illustrated embodiment, based on the positioning of the sensor 502 relative to the reel 116, the sensor 502 is configured to transmit electromagnetic waves (e.g., radio waves or visible light waves) through a portion of the reel 116 for reflection off a surface (e.g., the ground surface 301) and subsequently receive or detect such waves as reflected off such surface (e.g., as indicated by outgoing arrows 512 and incoming arrows 514). However, as the reel 116 is rotated relative to the sensor 502 (e.g., in the rotational direction indicated by arrow 516), the various tine bars 506 will pass through the field of view of the sensor 502 at a given frequency (i.e., the tine bar pass frequency) generally proportional to the rotational speed of the reel 116. As indicated above, such passage of the tine bars 506 through the sensor's field of view will generally create noise or interference within the sensor signals generated by the sensor 502, which can result in inaccuracies in the associated parameter being monitored via the controller 400 based on the sensor signals. For instance, when the sensor 502 corresponds to a height sensor configured to detect the location of the ground surface 301 to allow the controller 400 to monitor the height of the header 110 relative to the ground, the electromagnetic waves transmitted from the sensor 502 will periodically reflect off of the tine bars 506 as opposed to being transmitted through the reel 116 to the ground, thereby resulting in height signals or data being generated by the sensor 5023 that do not accurately reflect the header height.

As indicated above, to address this issue, the controller 400 may be configured to filter the signals received from the sensor 502 to remove any noise or interference deriving from the reel 116 as it passes through the field of view of the sensor 502. For example, as shown in FIG. 6, the controller 400 may be configured to receive the raw or unfiltered signals from the sensor 502 (e.g., at box 540) and perform signal processing by applying a filter 542 to the signals to generate a set of processed or filtered sensor signals (e.g., at a box 544) that can then be used by the controller 400 for subsequent processing and/or analysis. As indicated above, the controller 400 may be configured to apply various different filters or filtering methods to filter the noise/interference from the sensor signals, such as a frequency-based filtering method, an amplitude-based filtering method, and/or a distance-based filtering method. For instance, in one embodiment, a frequency-based filter, such as a band-stop filter, may be applied to filter out the tine bar pass frequency from the sensor signals. In such an embodiment, the tine bar pass frequency may be determined in real-time by the controller 400 (e.g., based on speed data received from the speed sensor 206 (FIG. 1) associated with the reel 116) or the tine bar pass frequency may be included within a predetermined frequency range stored within the controller's memory 404.

As described above, when applying an amplitude-based filtering method, reflectors may be installed on or provided in association with the reel 116 to amplify the signal received by the sensor 502 when the electromagnetic waves reflect off the reel 116 as opposed to the ground, thereby allowing such amplified signals to be easily identified and filtered out based on the application of an associated amplitude threshold. For example, as shown in FIG. 6, one or more reflectors 550 are installed on each tine bar 506 to provide highly reflective surfaces for reflecting the electromagnetic waves back to the sensor 502. Thus, as the tine bars pass 506 through the field of view of the sensor 502, the electromagnetic waves will reflect off the reflectors 550 and be detected by the sensor 502 as a higher amplitude return than what would otherwise be reflected off the tine bars 506, thereby providing an easy and effective means for filtering out the interference from the sensor signals. As an alternative to installing reflectors on the reel 116 as separate components, the reflectors or reflective properties may, instead, be incorporated or integrated into one or more components of the reel 116. For instance, the tine bars 606 may be designed or configured such that the components of the bars 606 (the support tubes and/or the tines), themselves, reflect the electromagnetic waves back to the sensor 502 as higher amplitude returns.

It should be appreciated that the specific type and/or configuration of the reflectors 550 used may generally vary depending on the type or frequency of electromagnetic waves being generated by the sensor 502. For instance, for a radar sensor, the reflectors 550 may be formed from a suitable material and/or may have any suitable shape (e.g., the inside corner of a cube) that provides for increased reflectivity of radio waves. Similarly, for a laser or light-based sensor, the reflectors may be formed from a suitable material and/or may have any suitable shape that provides for increased reflectivity of visible light waves.

Figure 7:
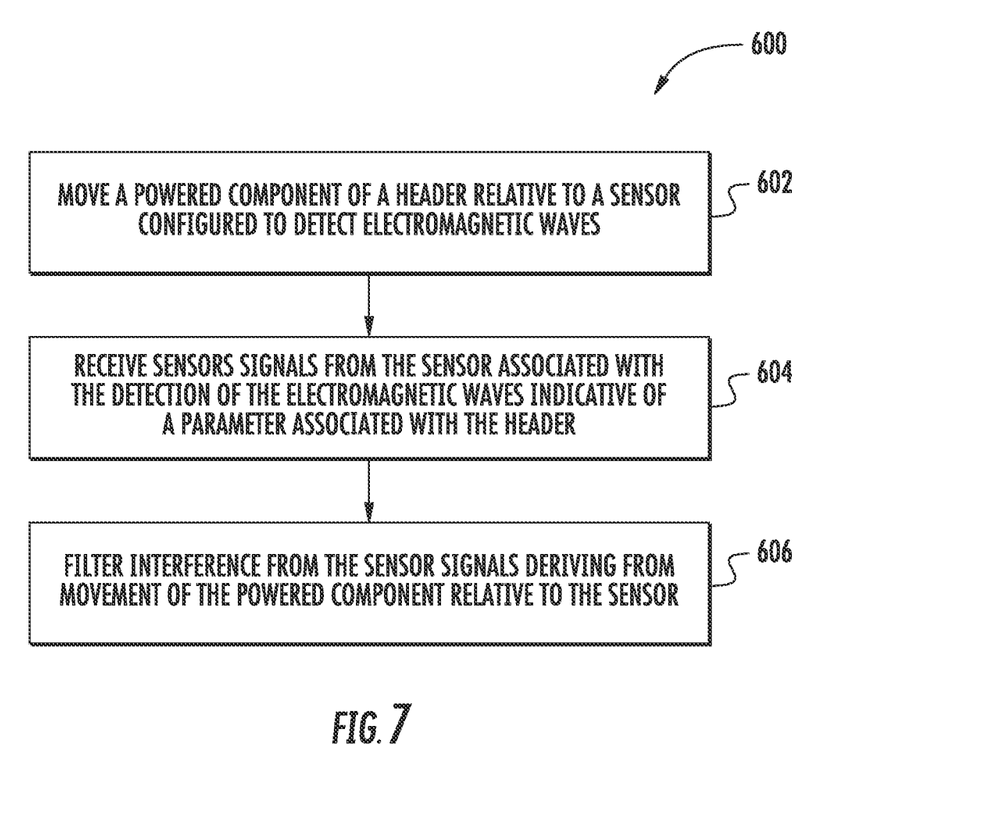
FIG. 7 illustrates a flow diagram of one embodiment of a method for filtering signal interference deriving from powered components of a header of an agricultural vehicle, in accordance with an exemplary embodiment of the present invention.

Referring now to FIG. 7, a flow diagram of one embodiment of a method 600 for filtering signal interference deriving from powered components of a header of an agricultural vehicle is illustrated in accordance with aspects of the present subject matter. For purposes of discussion, the method 600 will generally be described herein with reference to the header and related systems and components described above with reference to FIGS. 1-6. However, it should be appreciated that the disclosed method 600 may generally be used with headers having any other suitable header configuration and/or with systems/components having any other suitable system/component configuration. Additionally, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (602), the method 600 includes moving a powered component of a header relative to a sensor configured to detect electromagnetic waves. For instance, as indicated above, a reel 116 of the header 110 may be configured to be rotated relative to one or more sensors, such as any of the sensors 202, 324, 502 described above.

Additionally, at (604), the method 600 includes receiving sensors signals from the sensor associated with the detection of the electromagnetic waves indicative of a parameter associated with the header. For instance, as described above, one or more sensors may be configured to detect electromagnetic waves associated with a parameter of the header 110, such as the ambient light level surrounding the header 110 and the height of the header 110 relative to the ground. In such an embodiment, the sensor(s) may correspond to a passive sensor(s) configured to detect electromagnetic waves deriving from a separate source (e.g., the light sensors 202) or the sensor(s) may correspond to an active sensor(s) configured to detect the electromagnetic waves transmitted from the sensor(s) as reflected off a given surface (e.g., the height sensors 324 or sensor 502). Regardless of the sensor type, the sensors may generally be configured to transmit sensor signals associated with the detection of electromagnetic waves to a suitable electronic control unit, such as controller 400.

Moreover, at (606), the method 600 includes filtering interference from the sensor signals deriving from movement of the powered component relative to the sensor. Specifically, as indicated above, the controller 400 may, for example, be configured to filter interference from the sensor signals that derives from the rotating reel 116 of the header 110. In such an embodiment, the controller 400 may be configured to apply any suitable filtering method to filter the interference from the sensor signals, such as frequency-based filtering method, an amplitude-based filtering method, and/or distance-based filtering method.

It is to be understood that the steps of the methods disclosed herein are performed by an electronic control unit(s) (e.g., controller 210, controller 320, and/or controller 400) upon loading and executing software code or instructions which are tangibly stored on the tangible computer readable medium, such as on a magnetic medium, e.g., a computer hard drive, an optical medium, e.g., an optical disc, solid-state memory, e.g., flash memory, or other storage media known in the art. Thus, any of the functionality performed by the electronic control unit(s) described herein, such as the methods 300, 600, is implemented in software code or instructions which are tangibly stored on a tangible computer readable medium. The electronic control unit(s) loads the software code or instructions via a direct interface with the computer readable medium or via a wired and/or wireless network. Upon loading and executing such software code or instructions by the electronic control unit(s), the electronic control unit(s) may perform any of the functionality of any of the electronic control units described herein, including any steps of the methods 300, 600 described herein.

The term "software code" or "code" used herein refers to any instructions or set of instructions that influence the operation of a computer or electronic control unit(s). They may exist in a computer-executable form, such as machine code, which is the set of instructions and data directly executed by a computer's central processing unit or by an electronic control unit(s) in a human-understandable form, such as source code, which may be compiled in order to be executed by a computer's central processing unit or by an electronic control unit(s), or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by an electronic control unit(s).

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A system for filtering signal interference from sensor signals associated with headers configured for use with agricultural vehicles, the system comprising:
   a header comprising a frame and a powered component supported relative to the frame;
   a sensor configured to detect electromagnetic waves indicative of a parameter associated with the header; and
   an electronic control unit operably connected to the sensor such that the electronic control unit is configured to receive signals from the sensor associated with the detection of the electromagnetic waves, the electronic control unit being further configured to filter interference from the signals deriving from motion of the powered component relative to the sensor,
   wherein the powered component moves in and out of a field of view of the sensor as the powered component moves relative to the sensor.

2. The system of claim 1, wherein the powered component is configured to rotate relative to the sensor.

3. The system of claim 2, further comprising a speed sensor configured to detect a rotational speed of the powered component, the electronic control unit being operably connected to the speed sensor such that the electronic control unit is configured to receive data from the speed sensor associated with the rotational speed of the powered component, the electronic control unit being configured to filter the interference from the signals based at least in part on the rotational speed of the powered component.

4. The system of claim 3, wherein the rotational speed is proportional to one or more frequencies associated with the interference deriving from the rotation of the powered component relative to the sensor, the electronic control unit being configured to filter out the one or more frequencies from the signals.

5. The system of claim 1, wherein portions of the powered component pass through the field of view of the sensor at a pass frequency as the powered component moves relative to the sensor, the electronic control unit being configured to apply a filter that filters out the pass frequency from the signals.

6. The system of claim 1, wherein portions of the powered component pass through the field of view of the sensor as the powered component rotates relative to the sensor, the system further comprising a speed sensor operably connected to the electronic control unit that is configured to generate detection signals indicative of a rotational speed of the powered component, with the detection signals being generated in sync with the portions of the powered component passing through the field of view of the sensor, the electronic control unit being configured to filter the interference from the signals based on the detection signals received from the speed sensor.

7. The system of claim 1, wherein the electronic control unit is configured to apply a filter that filters out a predetermined frequency range determined as a function of a speed range of the powered component.

8. The system of claim 1, wherein the sensor comprises a light sensor configured to detect ambient light.

9. The system of claim 1, wherein the sensor comprises an active sensor configured to transmit the electromagnetic waves outwardly therefrom and subsequently detect the electromagnetic waves as reflected off a surface.

10. A system for filtering signal interference from sensor signals associated with headers configured for use with agricultural vehicles, the system comprising:
- a header comprising a frame and a powered component supported relative to the frame;
- a sensor configured to detect electromagnetic waves indicative of a parameter associated with the header;
- one or more reflectors provided in association with the powered component, the one or more reflectors being configured to reflect the electromagnetic waves towards the sensor at amplitudes that exceed an amplitude threshold; and
- an electronic control unit operably connected to the sensor such that the electronic control unit is configured to receive signals from the sensor associated with the detection of the electromagnetic waves, the electronic control unit being further configured to filter interference from the signals deriving from motion of the powered component relative to the sensor by filtering out signals having an amplitude that exceeds the amplitude threshold.

11. The system of claim 10, wherein the sensor comprises an active sensor configured to transmit the electromagnetic waves outwardly therefrom and subsequently detect the electromagnetic waves as reflected off a surface.

12. The system of claim 10, wherein the powered component moves in and out of a field of view of the sensor as the powered component moves relative to the sensor.

13. The system of claim 12, wherein a plurality of portions of the powered component pass in and out of the field of view of the sensor as the powered component moves relative to the sensor, wherein a reflector of the one or more reflectors is installed on each portion of the plurality of portions of the powered component.

14. The system of claim 10, wherein the amplitude threshold is selected based on an anticipated range of the signals from the sensor.

15. The system of claim 10, wherein the sensor comprises a light sensor configured to detect ambient light.

16. A system for filtering signal interference from sensor signals associated with headers configured for use with agricultural vehicles, the system comprising:
- a header comprising a frame and a powered component supported relative to the frame;
- a sensor configured to detect electromagnetic waves indicative of a distance from the sensor to a given surface; and
- an electronic control unit operably connected to the sensor such that the electronic control unit is configured to receive signals from the sensor associated with the detection of the electromagnetic waves, the electronic control unit being further configured to filter interference from the signals deriving from motion of the powered component relative to the sensor by filtering out signals associated with distances from the sensor that fall within a predetermined range of distances within which the powered component is potentially located.

17. The system of claim 16, wherein the electronic control unit is configured to filter out signals associated with distances that do not exceed a minimum distance threshold, the minimum distance threshold being equal to or greater than a maximum distance of the predetermined range of distances.

18. The system of claim 16, wherein the sensor comprises an active sensor configured to transmit the electromagnetic waves outwardly therefrom and subsequently detect the electromagnetic waves as reflected off a surface.

19. The system of claim 16, wherein the powered component moves in and out of a field of view of the sensor as the powered component moves relative to the sensor.

20. The system of claim 16, wherein the given surface comprises a surface of the ground located below the header.

* * * * *